March 9, 1954
A. W. DUNCAN
2,671,701
TROUGHED IDLER
Filed March 25, 1952
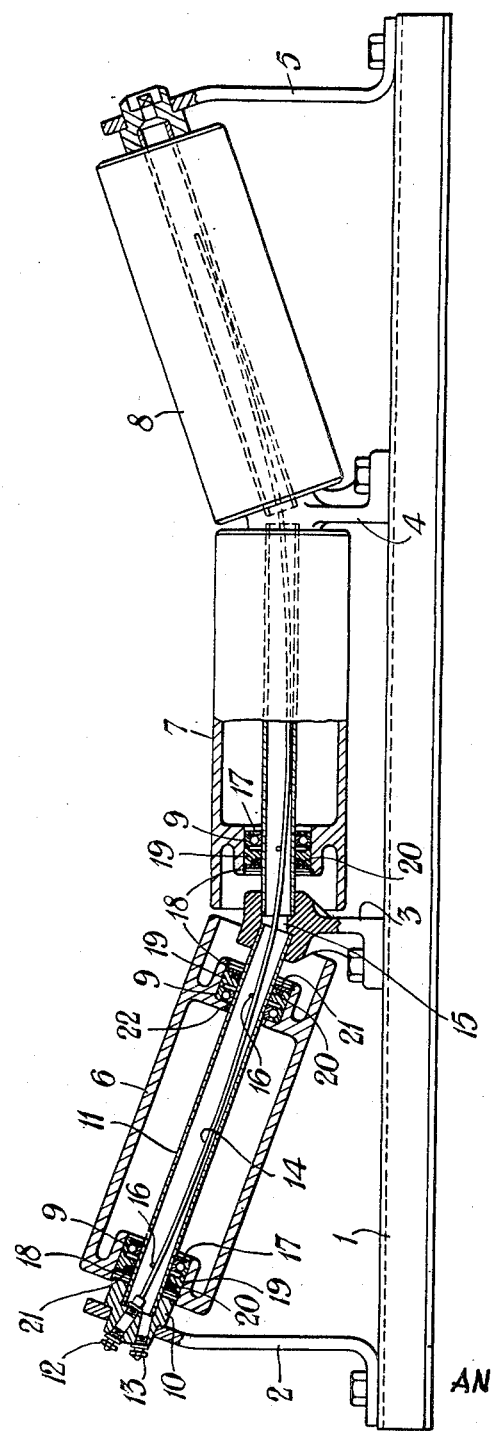
INVENTOR
ANGUS W. DUNCAN Patented Mar. 9, 1954

2,671,701

UNITED STATES PATENT OFFICE 2,671,701

TROUGHED IDLER

Angus Wellesley Duncan, Worcester, England, assignor to The Mining Engineering Company Limited, Worcester, England Application March 25, 1952, Serial No. 278,412

Claims priority, application Great Britain March 28, 1951

5 Claims. (Cl. 308—20)

Troughed idlers of the three or more roll type are commonly used on belt conveyors and are generally grease lubricated by the commonly known nipple and grease gun system. It is common practice to feed the lubricant to centre brackets supporting drilled spindles on which the rolls are carried and thence through the spindles to the bearing houses. It is also common practice to employ tubular spindles and fit grease nipples communicating with the spindles of both the outer rolls and so arranged that the lubricant is fed through the hollow spindles to three or more bearing housings on each side of the troughed idler.

For certain applications it may be desirable to lubricate all the bearings entirely from one side, the other side of the idler being inaccessible. In such cases it is common practice to employ a cylinder or tube external of the tubular spindles connecting the two housings in each roll. Grease introduced at one end of the troughed idler thus passes through the tubular spindles and is distributed to each bearing housing through holes drilled in the spindles. The escape of grease into the interior of the rolls is prevented by the tubes connecting the housings in each roll.

The object of this invention is to provide a troughed idler of the grease lubricated type which can be lubricated from one end only of the assembly without the need to enclose the housings in each roll by an additional tubular member.

According to the invention a troughed idler assembly of the kind in which hollow rolls are mounted on tubular spindles by anti-friction bearings is provided at one end with a pair of grease nipples, one of which communicates directly with the interiors of all the tubular spindles through drilled centre brackets while the other is fitted with a small diameter tube led through the spindles and brackets to a point adjacent the far end bearing, apertures being provided in the spindles opposite each bearing and the bearings being sealed on each side against the leakage of lubricant.

Put in another way, a troughed idler assembly according to the invention having rolls mounted on tubular spindles by means of anti-friction bearings, is provided in one end bracket with a pair of grease nipples while the other end bracket is closed, the centre brackets are drilled to give free passage for lubricant between the ends of adjacent spindles, the anti-friction bearings are sealed against grease leakage into the body of the roll and out of the end of the roll and the spindles are apertured opposite each bearing for supplying lubricant thereto, one of the grease nipples communicates with the centre of the adjacent tubular spindle and the other is provided with a small diameter tube which passes through the spindles and brackets to a point adjacent the bearing at the opposite side.

The sealing of the bearings is preferably attained by means of felt washers or labyrinth type seals on their outer sides and by washers or by special formation of the races or housings on their inner sides.

The above and other parts of the invention are embodied in a preferred form of troughed idler assembly which will now be described in some detail by way of example with reference to the accompanying drawing which is a part sectioned end elevation of a typical three roll assembly.

An inverted channel section base plate 1 is used to carry four brackets 2, 3, 4, 5 for the support of three rolls 6, 7, 8.

The rolls are of the fixed hollow spindle type and rotate upon anti-friction bearings 9 carried in housings formed at or near their ends.

A boss 10 fitted to the end bracket 2 carrying the hollow spindle 11 of the adjacent roll 6 at one side is drilled and threaded to receive a pair of grease nipples 12 and 13. Grease nipple 13 communicates directly with the interior of the spindle 11 and grease nipple 12 gives access to a small diameter tube 14 which is fixed in the interior face by means of a standard acorn and union nut and which extends inside the spindle 11.

The two centre supporting brackets 3 and 4 are apertured as at 15 to give a free passage between the open ends of adjacent spindles.

The small diameter tube 14 extends through the apertures of both centre brackets 3 and 4 and terminates near the far end of the roll 8.

The hollow spindles are each apertured near each end as at 16 opposite the bearing housings of the roll which they carry.

In one form each bearing is located in its housing at its inner side by a small snap ring 17 engaged between its outer race and a groove in the hollow spindle and is located at its outer side by a second snap ring 18 engaged in a groove in the bearing housing; an end cap or distance piece 19 incorporating an annular groove for a felt sealing washer 20 and steel retaining washer 21 or a labyrinth seal is preferably interposed between the bearing and the snap ring in its housing.

In another form the bearings are located at their inner sides and are sealed against leakage of lubricant into the bodies of the rolls by means of an inward flange formed on the housings and extending close into the spindles, such an extended flange is shown under reference number 22 at the right hand end of the roller 6. In this case a standard bearing is used with no provision for a snap ring.

In assembling the idler structure, the small diameter tube is fixed to the boss 10, and completely assembled rolls and centre brackets are threaded over the extending tube 14, which bends to conform to the natural troughing of the rolls as the centre and remote end bracket are bolted to the base plate.

In use lubricant is fed to the adjacent anti-friction bearings through the nipple 13 and hollow spindle 11 with which it communicates, while the remote end bearing or bearings are fed with lubricant through the nipple 12 and small diameter tube 14.

In this way the seals of the adjacent bearings are relieved from the high pressures which would be necessary to feed lubricant direct from the nipple communicating with the hollow spindles to the remote bearings and wastage of lubricant into the body of the rolls and beyond the bearings is avoided.

I claim:

1. In a multi-roll troughed idler assembly having hollow rolls mounted on tubular spindles by anti-friction bearings carried in housings, the spindles being apertured to give access to the bearings and being supported on brackets drilled to permit communication between the interiors of all the spindles and a pair of grease nipples are in communication with said tubular spindles for supplying lubricant to said bearings, the improvement wherein both said nipples are disposed at one side of the assembly, one nipple giving direct access to the interior of the spindle of the roll at that side of the assembly and the other nipple being connected to a small diameter tube led through the spindles and brackets to a point adjacent the far end bearing of the roll at the other side of the assembly.

2. A multi-roll troughed idler assembly according to claim 1 in which the nipples are mounted in a boss carried in an end bracket.

3. A multi-roll troughed idler assembly according to claim 1 in which the anti-friction bearings are sealed from the interiors of the hollow rolls by spring clips engaging the bearing outer races and the hollow spindles.

4. A multi-roll troughed idler assembly according to claim 1 in which the anti-friction bearings are sealed against leakage of lubricant on their outer sides by felt washers retained in position by metal washers and snap rings engaging grooves in their housings.

5. A multi-roll troughed idler assembly according to claim 1 in which the anti-friction bearings are sealed from the interiors of the hollow shells by inwardly extending flanges of their housings.

ANGUS WELLESLEY DUNCAN.

References Cited in the file of this patent
UNITED STATES PATENTS

| Number | Name | Date |
|---|---|---|
| 571,604 | Robins | Nov. 17, 1896 |
| 2,287,357 | Nyborg | June 23, 1942 |
| 2,539,792 | Niemitz | Jan. 30, 1951 |
| 2,557,418 | Duncan | June 19, 1951 |